US00RE50855E

(19) United States
(12) Reissued Patent
Moon et al.

(10) Patent Number: US RE50,855 E
(45) Date of Reissued Patent: Apr. 7, 2026

(54) HERMETIC COMPRESSOR WITH CYLINDER HAVING ELLIPTICAL INNER CIRCUMFERENTIAL SURFACE, ROLLER, AND AT LEAST ONE VANE

(71) Applicant: LG ELECTRONICS INC., Seoul (KR)

(72) Inventors: Seokhwan Moon, Seoul (KR); Seoungmin Kang, Seoul (KR); Byeongchul Lee, Seoul (KR)

(73) Assignee: LG ELECTRONICS INC., Seoul (KR)

(21) Appl. No.: 17/723,766

(22) Filed: Apr. 19, 2022

Related U.S. Patent Documents

Reissue of:
(64) Patent No.: 10,767,649
Issued: Sep. 8, 2020
Appl. No.: 15/855,091
Filed: Dec. 27, 2017

(30) Foreign Application Priority Data

Dec. 29, 2016 (KR) ..... 10-2016-0182836

(51) Int. Cl.
*F04C 23/00* (2006.01)
*F01C 21/10* (2006.01)
(Continued)

(52) U.S. Cl.
CPC ..... *F04C 23/008* (2013.01); *F01C 21/106* (2013.01); *F04C 18/344* (2013.01);
(Continued)

(58) Field of Classification Search
CPC .. F04C 18/344; F04C 18/3441; F04C 23/008; F04C 27/002; F04C 2250/30;
(Continued)

(56) References Cited

U.S. PATENT DOCUMENTS 2,523,317 A * 9/1950 McGill ..... F04C 18/3441 418/87
4,299,097 A 11/1981 Shank et al.
(Continued)

FOREIGN PATENT DOCUMENTS

DE 10 2006 032 219 1/2008
DE 10 2006 032 219 A1 1/2008
(Continued)

OTHER PUBLICATIONS

English translation of DE-102006032219-A1 retrieved from EPO's Espacenet website.*
(Continued)

*Primary Examiner* — Peter C English
(74) *Attorney, Agent, or Firm* — KED & ASSOCIATES, LLP

(57) ABSTRACT

A hermetic compressor may include a cylinder having an [elliptical] inner circumferential surface; a roller eccentric from the inner circumferential surface; and at least one vane withdrawn towards the inner circumferential surface when the roller is rotated to divide a compression [chamber] *space into compression chambers*. [On the basis of] *A first center line passes through* a [ contact] *reference* point where the inner circumferential surface *of the cylinder* and an outer circumferential surface *of the roller* are closest[, a first center line passes] *and* through a *lateral* center of *an inner space of* the cylinder[, an] . *A first pair of* ellipse *segments are* positioned at a first side of the first center line and [forming] *form portions of* the inner circumferential surface[is a first ellipse, a] . *A* center point of the first *pair of* ellipse *segments* is a first center point[, an] . *A second pair of* ellipse *segments are* positioned at a second side of the first center line and [forming] *form portions of* the inner circumferential surface [is a second ellipse, a] . *A* center point of the second *pair of* ellipse *segments* is a second center point, and the first center
(Continued)

point and the second center point are spaced apart from the *lateral* center *of the inner space of the cylinder*.

15 Claims, 10 Drawing Sheets

(51) Int. Cl.
*F04C 18/344* (2006.01)
*F04C 27/00* (2006.01)
*F04C 29/12* (2006.01)

(52) U.S. Cl.
CPC ..... *F04C 18/3441* (2013.01); *F04C 27/002* (2013.01); *F04C 27/005* (2013.01); *F04C 29/128* (2013.01); *F04C 2240/50* (2013.01); *F04C 2250/30* (2013.01); *F04C 2250/301* (2013.01)

(58) Field of Classification Search
CPC ..... F04C 2250/301; F04C 27/005; F04C 29/128; F04C 2240/50; F01C 21/106
See application file for complete search history.

(56) References Cited

U.S. PATENT DOCUMENTS 4,373,880 A * 2/1983 Tanaka et al. ..... F04C 18/3441 418/150
4,408,968 A * 10/1983 Inagaki ..... F04C 29/12 418/15
4,410,305 A 10/1983 Shank et al.
4,480,973 A * 11/1984 Ishizuka ..... F04C 18/3446 418/150
4,653,991 A * 3/1987 Takao ..... F01C 21/0872 418/268
4,737,090 A * 4/1988 Sakai et al. ..... F04C 18/3441 418/150
5,310,326 A 5/1994 Gui et al.
5,431,552 A * 7/1995 Schuller et al. ..... F04C 2/3441 418/268
7,083,402 B2 * 8/2006 Ichikawa ..... F01C 21/0809 418/145
7,300,267 B2 * 11/2007 Yildirim et al. ..... F04C 2/3445 418/148
2008/0193301 A1 * 8/2008 Fujii ..... F04C 23/001 418/9
2009/0129960 A1 * 5/2009 Yamamuro et al. .. F04C 14/223 418/260
2014/0369878 A1 * 12/2014 Shimaguchi ..... F04C 29/12 418/15
2015/0147216 A1 * 5/2015 Shimaguchi ..... F04C 29/12 418/15

FOREIGN PATENT DOCUMENTS

DE 102011078035 A1 * 12/2012 ..... F01C 21/106
DE 102015006937 A1 * 12/2015 ..... F04C 2/3445
GB 2 028 430 3/1980
GB 2 028 430 A 3/1980
JP S59201991 A * 11/1984

OTHER PUBLICATIONS

English translation of DE-102011078035-A1 retrieved from EPO's Espacenet website.*
English translation of DE-102015006937-A1 retrieved from EPO's Espacenet website.*
English translation of JP-S59201991-A retrieved from EPO's Espacenet website.*
European Search Report dated May 15, 2018 for Application No. 17210848.2.
U.S. Office Action issued in U.S. Appl. No. 15/855,091 dated Dec. 26, 2019.
European Search Report dated May 15, 2018.

* cited by examiner

FIG. 1 AMENDED
CONVENTIONAL ART
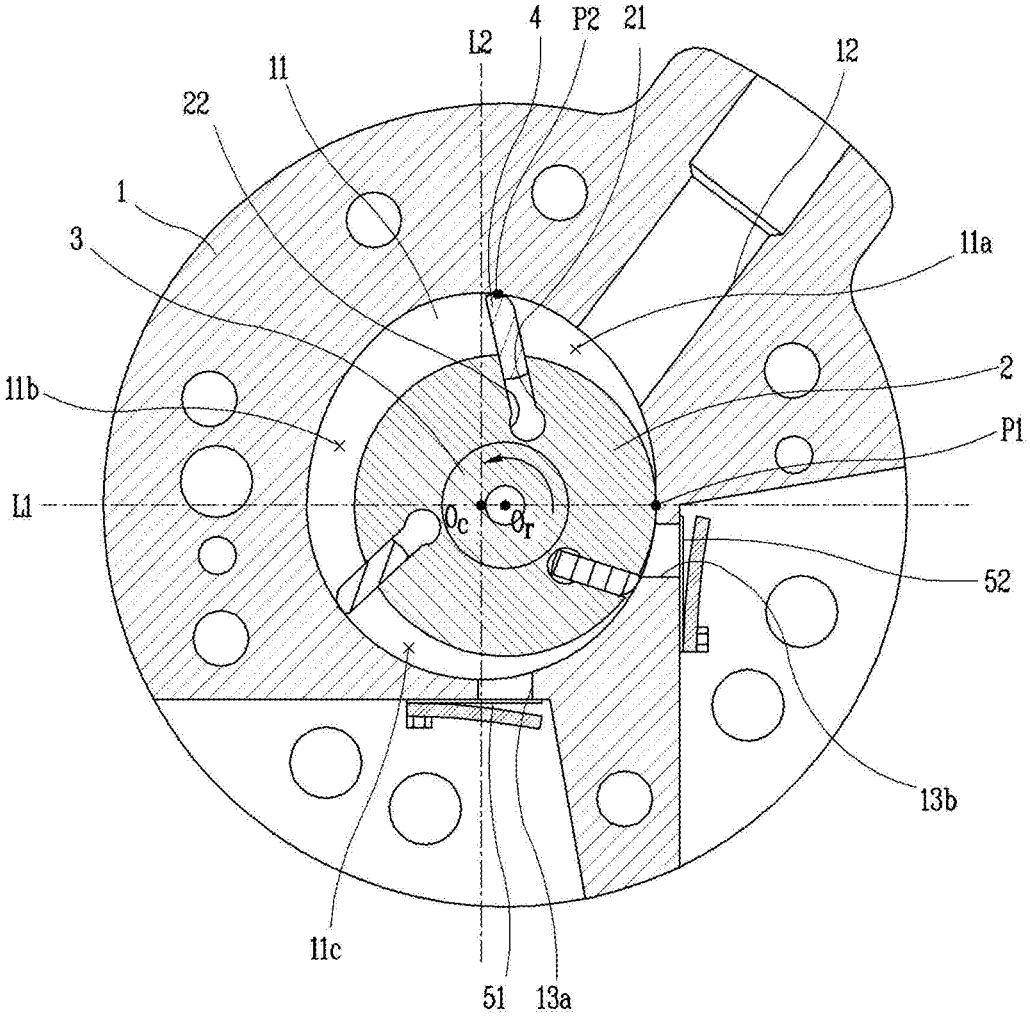

FIG. 3 AMENDED
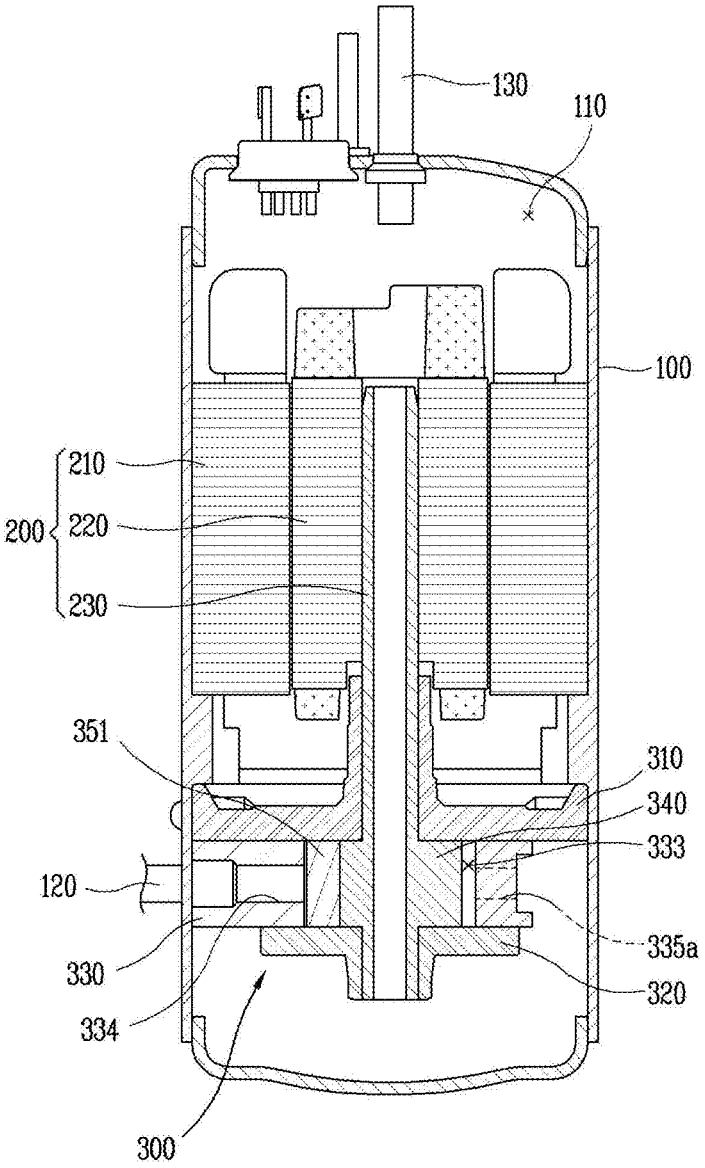

FIG. 4 AMENDED
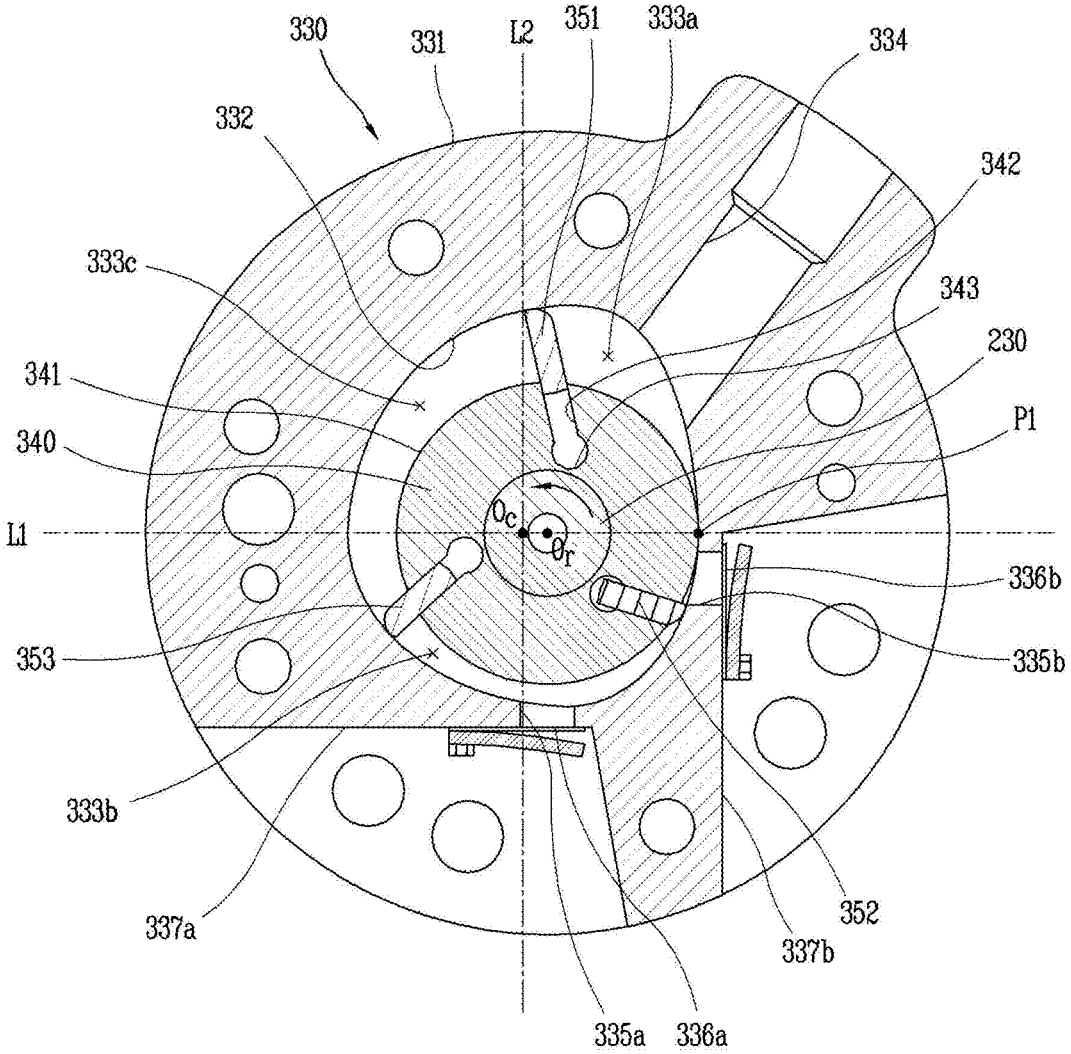

FIG. 8 AMENDED
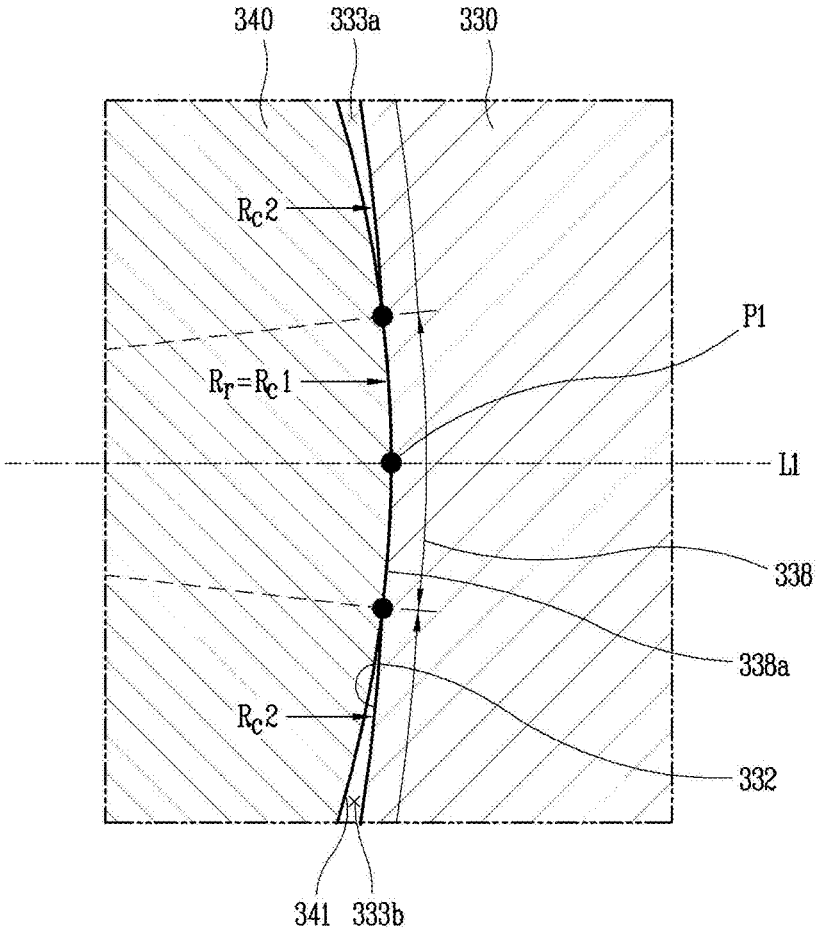

HERMETIC COMPRESSOR WITH CYLINDER HAVING ELLIPTICAL INNER CIRCUMFERENTIAL SURFACE, ROLLER, AND AT LEAST ONE VANE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

[Pursuant to 35 U.S.C. § 119(a), this] *This* application *is a Reissue Application of U.S. Pat. No. 10,767,649 issued Sep. 8, 2020* (*U.S. patent application Ser. No. 15/855,091 filed Dec. 27, 2017*), *which* claims [the benefit of an earlier filing date of and the right of] priority to Korean Application No. 10-2016-0182836, filed in Korea on Dec. 29, 2016, the contents of which are incorporated by reference herein in its entirety.

BACKGROUND

1. Field

A hermetic compressor, and more particularly, [to] a vane rotary compressor is disclosed herein.

2. Background

Generally, a rotary compressor is a compressor having a structure in which a roller and a vane contact each other, and a compression space of a cylinder is divided into a suction chamber and a discharge chamber [on the basis of] *by* the vane. In such a general rotary compressor (hereinafter referred to as a "rotary compressor"), [a] *the* vane performs a linear motion while [a] *the* roller performs an orbiting motion, and a refrigerant is suctioned, compressed, and discharged as [a] *volumes of the* suction chamber and [a] *the* discharge chamber [form a compression chamber having its volume] *are* changed.

Contrary to such a rotary compressor, there is a vane rotary compressor having a structure in which a vane inserted into a roller performs a rotary motion together with the roller, and a structure in which a compression chamber is formed as the vane is withdrawn by a centrifugal force and a back pressure. In such a vane rotary compressor, a plurality of vanes is rotated together with a roller, and the vanes slide as front end surfaces thereof contact an inner circumferential surface of a cylinder. This may cause a frictional loss to be increased in comparison to a general rotary compressor.

Such a vane rotary compressor may be formed such that an inner circumferential surface of a cylinder may have a circular shape. However, recently, a vane rotary compressor having a hybrid cylinder (hereinafter, referred to as a "hybrid rotary compressor") has been introduced, capable of reducing a frictional loss and enhancing a compression efficiency as an inner circumferential surface of a cylinder has an elliptical shape or a combination shape of an ellipse and a circle.

FIG. 1 is a cross-sectional view of a compression part of a vane rotary compressor in accordance with the conventional art. FIG. 2 is a schematic view for explaining a shape of an inner circumferential surface of a hybrid cylinder in the compression part of FIG. 1.

As shown, the conventional hybrid cylinder is formed as a symmetrical elliptical cylinder an inner circumferential surface of which is symmetrical [on the basis of] *with respect to* a first center line (L1) passing through a neighboring position between an inner circumferential surface of the cylinder 1 and an outer circumferential surface of a roller 2 (hereinafter, referred to as a "first [contact] *refrence* point" (P1)) and passing through a *lateral* center (Oc) of *an inner space of* the cylinder 1, and [on the basis of] *with respect to* a second center line (L2) perpendicular to the first center line (L1) and passing through the *lateral* center (Oc) of *the inner space of* the cylinder 1. That is, as shown in FIG. 2, the inner circumferential surface of the cylinder 1 includes a first ellipse *segment* 1a which is at an upper side[on the basis of] *with respect to* the first center line (L1), and a second ellipse *segment* 1b which is at a lower side [on the basis of] *with respect to* the first center line (L1). The first ellipse *segment* 1a has a symmetrical shape [on the basis of] *with respect to* the second center line (L2), and the second ellipse *segment* 1b has a symmetrical shape [on the basis of] *with respect to* the second center line (L2).

The roller 2 is eccentric from the *lateral* center (Oc) of *the inner space of* the cylinder 1, and a center (Or) of the roller 2 is concentric with a center (Os) of a rotary shaft 3. Accordingly, even while the roller 2 is being rotated, the [contact] *reference* point (P1) between the cylinder 1 and the roller 2 is maintained at a same position.

An outer circumferential surface of the roller 2 has a circular shape, and a plurality of vane slots 21 is formed on the outer circumferential surface of the roller 2 in a circumferential direction. As vanes 4 are slidably inserted into the vane slots 21, a compression space 11 of the cylinder 1 is divided into a plurality of compression chambers 11a,11b, 11c.

Back pressure chambers 22 that pressurize the vanes 4 towards the inner circumferential surface of the cylinder 1 by introducing oil (or a refrigerant) towards rear surfaces of the vanes 4 are formed at inner ends of the vane slots 21 corresponding to the rear surfaces of the vanes 4. Accordingly, if the roller 2 is rotated, the vanes 4 are withdrawn from the roller 2 by a centrifugal force and a back pressure to contact the inner circumferential surface of the cylinder 1 at a [contact] *reference* point (P2). The [contact] *reference* point (P2) between the vanes 4 and the cylinder 1 moves along the inner circumferential surface of the cylinder 1.

[On the basis of] *With respect to* the first [contact] *reference* point (P1) [between the cylinder 1 and the roller 2], a suction opening 12 is formed at one side of the inner circumferential surface of the cylinder 1, and discharge openings 13a,13b are formed at another side thereof.

The vane rotary compressor has an over-compression because its compression period is shorter than that of a general rotary compressor. Due to the over-compression, a compression loss occurs. Accordingly, in the conventional cylinder 1, in order to solve such over-compression, a compressed refrigerant is partially and sequentially discharged through a plurality of discharge openings 13a,13b formed along a compression path (a compression direction).

The discharge openings 13a,13b may include a sub discharge opening 13a (or a first discharge opening) [positioned] *located along the compression path* at [an] *a position* upstream [side on the basis] of [the compression path] *a main discharge opening 13b*, and [a] *the* main discharge opening 13b (or a second discharge opening) [positioned]

*located along the compression path* at a *position* downstream [side] *of the sub discharge opening 13a*. Discharge valves 51, 52 are installed outside the discharge openings 13a,13b.

In the conventional vane rotary compressor, as aforementioned, in order to solve over-compression, the plurality of discharge openings 13a,13b is formed on the inner circumferential surface of the cylinder 1, along the compression path. However, if the discharge opening 13a (especially, the sub discharge opening) has a very large inner diameter, leakage may increase among the compression chambers 11a,11b,11c. Accordingly, the inner diameter of the discharge opening 13a cannot be sufficiently obtained, and the over-compression cannot be solved. This may lower a compression efficiency.

Further, in the conventional vane rotary compressor, as the inner circumferential surface of the cylinder 1 is formed in a symmetrical shape, a volume diagram of the compression chambers cannot be variously controlled. As a result, there is a limitation in moving a suction completion [time] *point* or a compression starting [time] *point* towards the first [contact] *reference* point.

Furthermore, in the conventional vane rotary compressor, a compression starting time at the compression space of the cylinder 1 is delayed, and thus, a compression period becomes short. This may increase a pressure difference between the compression chambers. As a result, refrigerant leakage between the compression chambers may be increased, and a frictional loss may be increased between the cylinder and the vanes.

Also, in the conventional vane rotary compressor, as the compression starting time at the compression chambers of the cylinder 1 is delayed, a gradient of the compression period is sharply increased. This may lower a compression efficiency due to over-compression.

Additionally, in the conventional vane rotary compressor, as the cylinder 1 and the roller 2 *almost* linearly-contact each other at the first [contact] *reference* point (P1), a sealing area is reduced. This may cause refrigerant leakage between the compression chamber which forms the suction chamber, and the compression chamber which forms the discharge chamber. This may cause a suction loss or a compression loss.

BRIEF DESCRIPTION OF THE DRAWINGS

Embodiments will be described in detail with reference to the following drawings in which like reference numerals refer to like elements, and wherein:

FIG. 1 is a cross-sectional view of a compression part of a vane rotary compressor in accordance with the conventional art;

FIG. 3 is a longitudinal sectional view of a vane rotary compressor having a hybrid cylinder according an embodiment;

FIG. 4 is a cross-sectional view of a compression part applied to FIG. 3;

FIG. 8 is an enlarged sectional view of the cylinder shown in FIG. 4 according to another embodiment.

DETAILED DESCRIPTION

Figure 2:
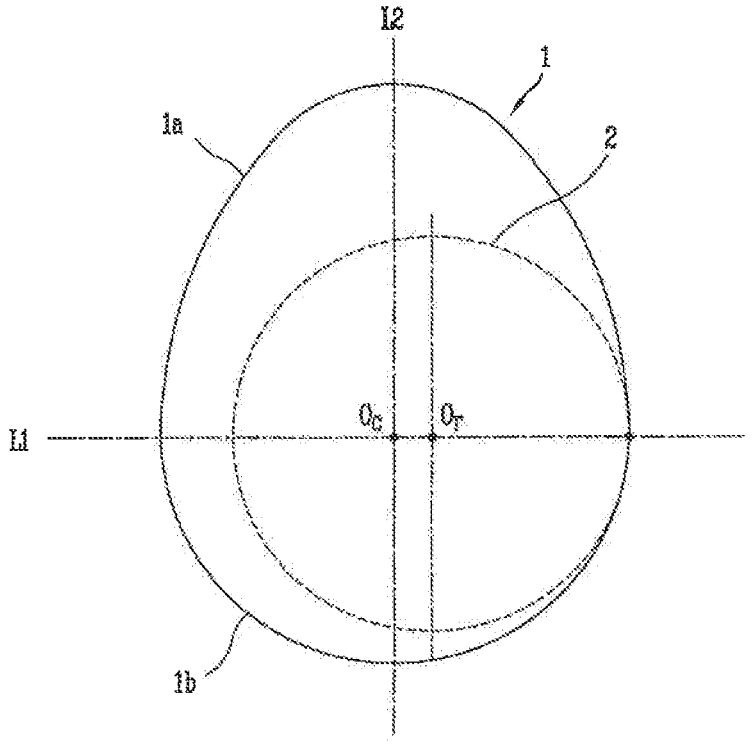
FIG. 2 CONVENTIONAL ART
FIG. 2 is a schematic view for explaining a shape of an inner circumferential surface of a hybrid cylinder in the compression part of FIG. 1.

Hereinafter, a vane rotary compressor according to an embodiment will be explained with reference to the attached drawings. Where possible, like reference numerals have been used to indicate like elements, and repetitive disclosure has been omitted.

FIG. 3 is a longitudinal sectional view of a vane rotary compressor having a hybrid cylinder according to an embodiment. FIG. 4 is a cross-sectional view of a compression part applied to FIG. 3.

As shown in FIG. 3, in the vane rotary compressor according to an embodiment, a motor part or motor 200 is installed in a casing 100, and a compression part or device 300 connected to the motor part 200 by a rotary shaft 230 is installed at one side of the motor part 200. The motor part 200 may include a stator 210 and a rotor 220. The casing 100 may be categorized into a horizontal type or a vertical type according to an installation aspect of the compressor. The vertical type has a structure that the motor part and the compression part are disposed at upper and lower sides in an axial direction, whereas the horizontal type has a structure that the motor part and the compression part are disposed at right and left or lateral sides.

The compression part 300 may include a cylinder 330 having a compression space [410] by a main bearing 310 and a sub bearing 320 installed at both sides in an axial direction. The cylinder 330 according to this embodiment may be formed such that an inner circumferential surface thereof has an elliptical shape rather than a circular shape. The cylinder 330 may be formed as a symmetrical ellipse having a pair of long and short axes, or may be formed as an asymmetrical ellipse having a plurality of pairs of long and short axes. Such a cylinder having an asymmetrical elliptical shape is called a hybrid cylinder, and this embodiment is related to a vane rotary compressor to which a hybrid cylinder is applied.

As shown in FIG. 4, the hybrid cylinder 330 according to this embodiment (hereinafter, referred to as a "cylinder") may have an outer circumferential surface 331 [formed in a circular shape. However, the] . *The* outer circumferential surface 331 of the cylinder 330 may be formed in a non-circular shape, if it can be fixed to an inner circumferential surface of the casing 100. The main bearing 310 or the sub bearing 320 may be fixed to the inner circumferential surface of the casing 100, and the cylinder 330 may be coupled to the bearing fixed to the casing 100 by, for example, a bolt.

An empty space portion or space which forms a compression space 333 and includes an inner circumferential surface 332 is formed at a middle part or portion of the cylinder 330. The empty space portion is sealed by the main bearing 310 and the sub bearing 320, thereby forming the compression space 333. A roller 340, which is discussed hereinafter, may be rotatably [coupled to] *positioned in* the compression space 333.

A suction opening 334 and discharge openings 335a,335b may be formed at both sides of the inner circumferential surface 332 of the cylinder 330 in a circumferential direction, [on the basis of a] *with respect to the first reference* point (*P1*) where the inner circumferential surface 332 of the cylinder 330 and an outer circumferential surface 341 of the roller 340 almost contact each other. The suction opening 334 may be directly connected to a suction pipe 120 which penetrates the casing 100, and the discharge openings 335a, 335b may be indirectly connected to a discharge pipe 130 which may be penetratingly-coupled to the casing 100 to communicate with an inner space 110 of the casing 100. Thus, a refrigerant may be directly suctioned into the compression space 333 through the suction opening 334. On the other hand, the compressed refrigerant may be discharged to the inner space 110 of the casing 100 through the discharge openings 335a,335b, and then discharged to the discharge pipe 130. Accordingly, the inner space 110 of the casing 100 maintains a high pressure state which forms a discharge pressure.

An additional suction valve is not installed at the suction opening 334, whereas discharge valves 336a,336b that open and close the discharge openings 335a,335b may be installed at the discharge openings 335a,335b. The discharge valves 336a,336b may be implemented as reed valves, [one] *first* ends of which may be fixed and [another] *second* ends of which may be formed as free ends. However, the discharge valves 336a,336b may be variously implemented as piston valves, for example, rather than reed valves.

If the discharge valves 336a,336b are implemented as reed valves, valve grooves 337a,337b [to mount the discharge valves 336a,336b ] may be formed [on an outer circumferential surface of] *in* the cylinder 330 *and the discharge valves 336a,336b mounted in the valve grooves 337a,337b*. Accordingly, as a length of the discharge openings 335a,335b is minimized, a dead volume may be reduced. As shown in FIG. 4, the valve grooves 337a,337b may be formed [in a triangular shape] so as to obtain a flat valve seat surface.

A plurality of the discharge openings 335a,335b may be formed along a compression path (a compression direction). For convenience, the discharge openings 335a,335b may be sorted as a sub discharge opening (or a first discharge opening) 335a [positioned] *located along the compression path* at [an] *a position* upstream [side on the basis of the compression path] *of a main discharge opening 335b*, and [a] *the* main discharge opening (or a second discharge opening) 335b [positioned] *located along the compression path* at a *position* downstream [side] *of the sub discharge opening 335a*.

However, the sub discharge opening is not necessarily required, but may be selectively provided. For example, in this embodiment, if the inner circumferential surface 332 of the cylinder 330 reduces an over-compression of a refrigerant as a compression period is formed to be long, which is discussed hereinafter, the sub discharge opening may not be formed. However, in order to minimize an over-compression amount of a refrigerant to be compressed, the sub discharge opening 335a may be formed at a front side of the main discharge opening 335b, for example, at an upstream side of the main discharge opening 335b [on the basis of] *in* the compression direction.

The roller 340 may be rotatably provided at the compression space 333 of the cylinder 330. The roller 340 may have a circular outer circumferential surface, and the rotary shaft 230 may be integrally coupled to a center of the roller 340. As a result, the roller 340 has a center (Or) consistent with a center of the rotary shaft 230, and the roller 340 is rotated around the center (Or) together with the rotary shaft 230.

[The] *Referring to Fig. 4, along a first center line (L1), the* center (Or) of the roller 340 is eccentric from a *lateral* center (Oc) of *an inner space of* the cylinder 330, that is, a center *along a short axis* of [an] *the* inner space of the cylinder 330, so that one side of the outer circumferential surface 341 of the roller 340 almost contacts the inner circumferential surface 332 of the cylinder 330. When it is assumed that a point of the cylinder 330 to which one side of the roller 340 almost contacts is [a] *the* first [contact] *reference* point (P1), the first [contact] *rederence* point (P1) may be at a [position corresponding to a short-axis of an ellipse formed as a] *point on the inner circumferential surface 332 of the cylinder 330 where the* first center line (L1) [passing] *which passes through* the *lateral* center (Oc) of *the inner space of* the cylinder 330 [contacts] *intersects* the inner circumferential surface 332 of the cylinder 330.

Vane slots 342 may be formed [on the outer circumferential surface 341 of] *in* the roller 340 [in a circumferential direction], and vanes 351,352,353 may be slidably coupled to the vane slots 342. The vane slots 342 may be formed in a radial direction [on the basis of] *with respect to* the center (Or) of the roller 340. However, in this case, it is difficult to sufficiently obtain a length of the vanes. Thus, the vane slots 342 may be formed with a predetermined inclination angle in the radial direction, for obtainment of the vane length.

The vanes 351,352,353 may be inclined [in a reverse direction] *with respect* to [a rotational] *the radial* direction of the roller 340. That is, front end surfaces of the vanes 351,352,353, which contact the inner circumferential surface 332 of the cylinder 330, may be inclined [towards the] *in a* rotational direction of the roller 340 such that a compression starting angle may be towards the rotational direction of the roller 340 for early-start of compression.

Back pressure chambers 343 for pressurizing the vanes 351,352,353 towards the inner circumferential surface 332 of the cylinder 330 by introducing oil (or a refrigerant) towards a rear side of the vanes 351,352,353 may be formed at inner ends of the vane slots 342. The back pressure chambers 343 may be sealed by the main bearing 310 and the sub bearing 320. The back pressure chambers 343 may independently communicate with a back pressure passage (not shown). However, the back pressure chambers 343 may communicate together with the back pressure passage.

The vanes 351,352,353 may include a first vane 351 [closest to the first contact point (P1) on the basis of the compression direction], a second vane 352[ secondly-closest to the first contact point (P1)], and the third vane 353 [farthest from the first contact point (P1)]. [In this case, the]*The* first and second vanes 351, 352 may be spaced from each other, the second and third vanes 352, 353 may be spaced from each other, and the third and first vanes 353, 351 may be spaced from each other, by a same circumferential angle.

Thus, when a compression chamber formed by the first and second vanes 351, 352 is a first compression chamber 333a, a compression chamber formed by the second and third vanes 352, 353 is a second compression chamber 333b, and a compression chamber formed by the third and first vanes 353, 351 is a third compression chamber 333c, all the compression chambers 333a,333b,333c have a same volume at a same crank angle.

The vanes 351,352,353 may be formed to have an approximate rectangular parallelepiped shape. Both ends of the vane in a lengthwise direction may include a front end surface contacting the inner circumferential surface 332 of the cylinder 330, and a rear end surface facing the back pressure chamber.

The front end surfaces of the vanes 351,352,353 may be curved so as to linearly-contact the inner circumferential surface 332 of the cylinder 330. The rear end surfaces of the vanes 351,352,353 may be flat so as to evenly receive a back pressure by being inserted into the back pressure chambers 343.

In the vane rotary compressor having a hybrid cylinder, if power is supplied to the motor part 200 to rotate the rotor 220 of the motor part 200 and the rotary shaft 230 coupled to the rotor 220, the roller 340 is rotated together with the rotary shaft 230. Then, the vanes 351,352,353 are withdrawn from or inserted into the vane slots 343 [by a centrifugal force generated] when the roller 340 is rotated[, and by a back pressure formed at a rear side of the vanes 351,352, 353]. As a result, the front end surfaces of the vanes 351,352,353 contact the inner circumferential surface 332 of the cylinder 330.

Then, the compression space 333 of the cylinder 330 forms compression chambers having a same number as the vanes 351,352,353, by the plurality of vanes 351,352,353. Each of the compression chambers 333a,333b,333c has its volume changed by a shape of the inner circumferential surface 332 of the cylinder 330 and an eccentric state of the roller 340 while moving along a rotation of the roller 340. A refrigerant filled in each of the compression chambers 333a,333b,333c is suctioned, compressed, and discharged while moving along the roller 340 and the vanes 351,352, 353.

This will be explained hereinafter. FIGS. 5A to 5D are sectional view showing processes to suction, compress, and discharge a refrigerant in the cylinder according to an embodiment.

Figure 5A:
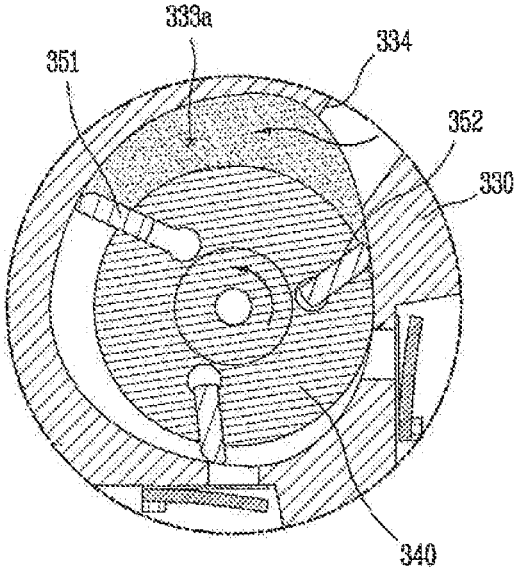
FIGS. 5A to 5D are sectional [view] *views* showing processes to suction, compress and discharge a refrigerant in a cylinder according to an embodiment.
Figure 5B:
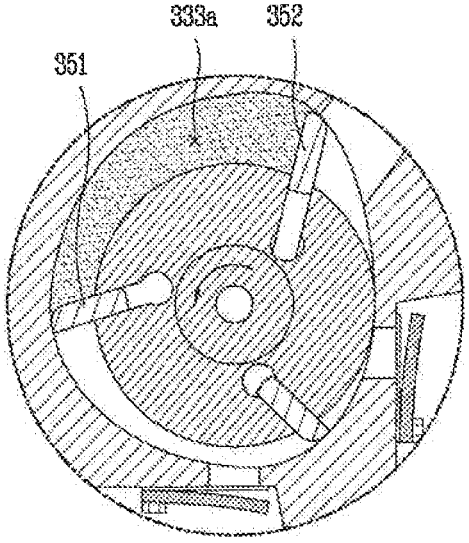

As shown in [FIG. 5A] *FIGS. 5A-5B*, until [before] the [first] *second* vane [351] *352* passes [through] *by* the suction opening 334 and [the second vane 352] reaches a suction completion time, a volume of the first compression chamber 333a is continuously increased. As a result, a refrigerant is continuously introduced into the first compression chamber 333a from the suction opening 334.

As shown in FIG. 5B, if the second vane 352 reaches the suction completion time (or a compression starting angle), the first compression chamber 333a is in a sealed state to move towards the discharge openings together with the roller 340. In this process, the volume of the first compression chamber 333a is continuously decreased. As a result, the refrigerant in the first compression chamber 333a is gradually compressed.

Figure 5C:
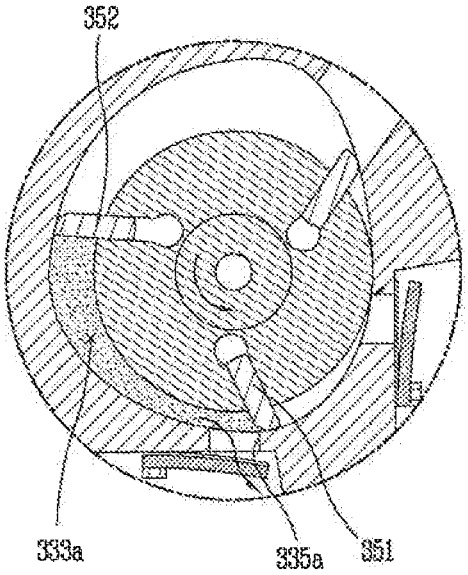

As shown in FIG. 5C, if the first vane 351 passes [through] *by* the first discharge opening 335a and the second vane 352 does not reach the first discharge opening 335a, the first compression chamber 333a communicates with the first discharge opening 335a, and the first discharge valve 336a is opened by a pressure of the first compression chamber 333a. Then, the refrigerant in the first compression chamber 333a is partially discharged to the inner space 110 of the casing 100 through the first discharge opening 335a. As a result, the pressure of the first compression chamber 333a is lowered to a predetermined value. If the first discharge opening 335a is not provided, the refrigerant of the first compression chamber 333a further moves towards the second discharge opening 335b[, the main discharge opening without being discharged out].

Figure 5D:
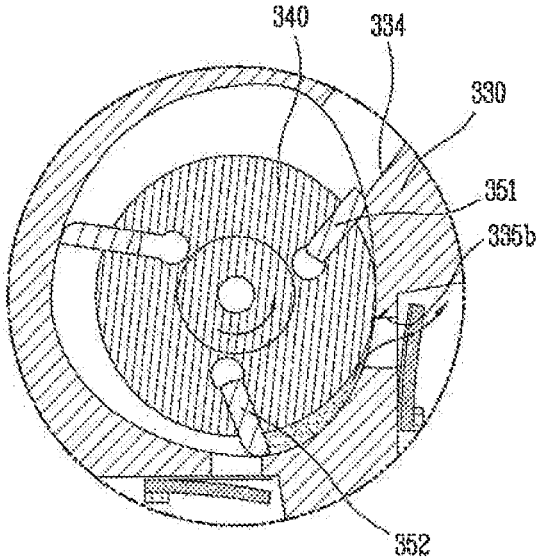

As shown in FIG. 5D, if the first vane 351 passes through the second discharge opening 335b and the second vane 352 reaches a discharge starting angle, the second discharge valve 336b is opened by the pressure of the first compression chamber 333a. As a result, the refrigerant of the first compression chamber 333a is discharged to the inner space 110 of the casing 100 through the second discharge opening [336b]*335b*.

The above processes are equally repeated at the second compression chamber 333b between the second and third vanes 352, 353, and at the third compression chamber 333c between the third and first vanes 353, 351. Accordingly, in the vane rotary compressor according to this embodiment, a discharge operation is performed three times per single rotation of the roller 340, that is, six times if a discharge operation from the first discharge opening is included.

However, if the hybrid cylinder has an inner circumferential surface formed in a symmetrical shape, a suction period is relatively long, and a compression period becomes short. This may cause a pressure difference at each compression chamber to be increased, resulting in leakage of a refrigerant to a space between the cylinder 330 and the vanes. Also, if a back pressure with respect to the vanes is increased, a frictional loss may be increased between the cylinder 330 and the vanes. Further, as the compression period becomes short, a gradient of the compression period also becomes steep. This may increase an over-compression amount, resulting in lowering a compression efficiency.

The hybrid cylinder according to this embodiment may prevent or solve over-compression by lowering a pressure difference between the compression chambers and by making the compression period have a gradual gradient, by decreasing the suction period of the compression chambers and by increasing the compression period.

Figure 6:
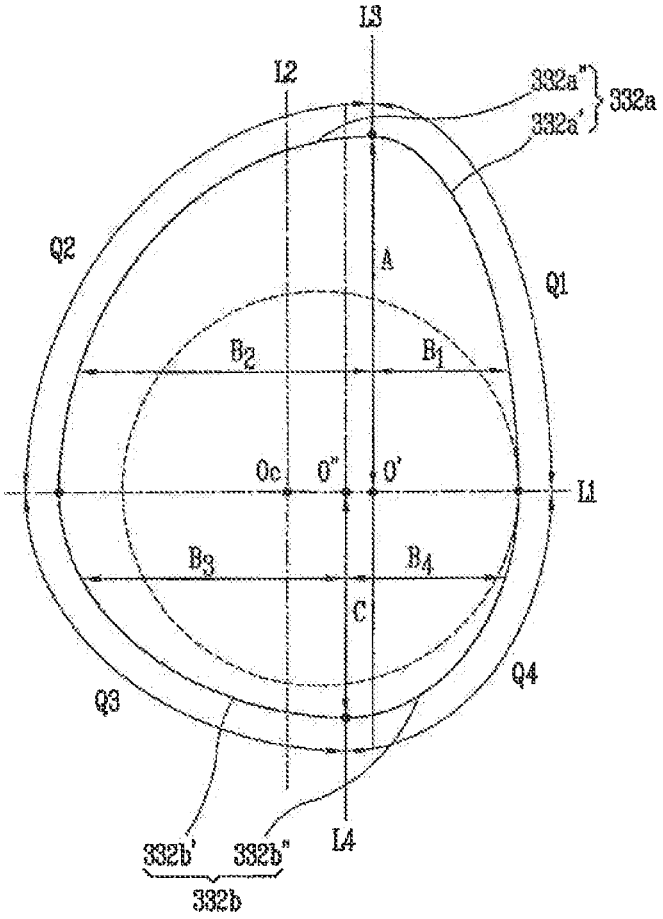
FIG. 6 is a schematic view for explaining a shape of an inner circumferential surface of a cylinder according to an embodiment.

FIG. 6 is a schematic view for explaining a shape of the inner circumferential surface of the cylinder according to an embodiment. As shown, the hybrid cylinder according to this embodiment may be formed such that an inner circumferential surface thereof may have [an] *a hybrid* elliptical shape. In this case, center points (O',O") [of the ellipse] may be spaced apart from a *lateral* center (Oc) of *an inner space of* the cylinder 330 by [a] predetermined [gap] *distances*, in an eccentric manner. For a reduced suction period and an increased compression period, the center points (O',O") [of the ellipse] may be positioned at *a side of* the suction opening 334 and the discharge openings 335a,335b [on the basis of] *with respect to* a second center line (L2) *that extends* perpendicular to a first center line (L1) [passing] *which passes* through the first [contact] *reference* point (P1) and the *lateral* center (Oc) of *the inner space of* the cylinder 330.

Further, if the center point (O') of the ellipse *segment* where the suction opening is formed is farther from the *lateral* center (Oc) of *the inner space of* the cylinder 330 than the center *point* (O") of the ellipse *segment* where the discharge openings are formed, [between the center points (O',O") which constitute the inner circumferential surface 332 of the cylinder 330,] the compression starting angle may be towards the suction opening as the suction period becomes short or [decrease] *decreases*. This may be more effective to restrict an over-compression. Further, the center point (O") of the ellipse *segment* where the discharge openings are formed may be closer to the center point (O') of the ellipse *segment* where the suction opening is formed, or may be farther from the *lateral* center (Oc) of *the inner space of* the cylinder 330 than the center point (O') [of the ellipse]. In this case, the compression period may become long or increase and the compression gradient may become gradual. This may be effective to reduce a compression loss.

For example, in the cylinder according to this embodiment, it is assumed that a line passing through the first [contact] *reference* point (P1) where the inner circumferential surface 332 of the cylinder 330 and the outer circumferential surface 341 of the roller 340 are closest to each other and passing through the *lateral* center of *the inner space of* the cylinder 330, is defined as [a] *the* first center line (L1). And it is assumed that a line perpendicular to the first center line (L1) and passing through the *lateral* center of *the inner space of* the cylinder 330 is defined as [a] *the* second center line (L2). In this case, the inner circumferential surface 332 of the cylinder 330 may have an asymmetrical shape [on the basis of] *with respect to* the first and second center lines (L1, L2).

That is, it is assumed that the inner circumferential surface 332 of the cylinder 330 includes a first ellipse *segment pair* (or partial *hybrid* ellipse) 332a positioned at one side of the first center line (L1), and a second ellipse *segment pair* (or partial *hybrid* ellipse)332b positioned at another side of the first center line (L1). And it is assumed that the first ellipse *segment pair* has [a] *the* first center point (O'), and the second ellipse *segment pair* has [a] *the* second center point (O"). In this case, the first center point (O') and the second center point (O") are spaced apart from the *lateral* center (Oc) of the *inner space of the* cylinder 330 in the same direction, on the first center line (L1).

The first ellipse *segment pair* 332a [may be] *is* formed as two [ellipses] *ellipse segments* (or partial ellipses) 332a', 332a" [having a same sum of distances to two focal points for every point thereon]. [Center points of the] *The* two [ellipses] *ellipse segments* 332a', 332a" [are overlapped with each other to form] *have* the same center point (O'). The ellipse *segment* 332a' *is* positioned at a relatively short distance from the first [contact] *reference* point (P1) [than] *compared to* the ellipse *segment* 332a" positioned at a relatively long distance from the first [contact] *reference* point (P1). *The ellipse segment 332a'*may be formed such that a distance between [two] *its* focal points [thereon] is relatively large *in comparison to a distance between focal points of the ellipse segment 332a"*. That is, the first ellipse *segment pair* 332a may be formed in an asymmetrical shape, [on the basis of] *with respect* a center line passing through the first center point (O') and perpendicular to the first center line (L1) (hereinafter, referred to as a "third center line L3")[, even if the sum of distances to two focal points for every point thereon is the same].

In this case, it is assumed that a section from the first [contact] *reference* point (P1) to an intersection point between the two [ellipses] *ellipse segments* 332a',332a", that is, the third center line (L3) is defined as a first quadrant (Q1), and a section from the third center line (L3) to the first center line (L1) in the rotational direction of the roller 340 is defined as a second quadrant (Q2). The ellipse *segment* 332a' in the first quadrant (Q1) and the ellipse *segment* 332a" in the second quadrant (Q2) have a same length of a long axis, but have different lengths of short axes. That is, as the ellipse *segment* 332a" in the second quadrant (Q2) has the longer short axis than the ellipse *segment* 332a' in the first quadrant (Q1), an eccentricity of the ellipse *segment* 332a' in the first quadrant (Q1) is larger than that of the ellipse *segment* 332a" in the second quadrant (Q2).

With such a configuration, a suction volume in the first quadrant (Q1) is increased, and a suction completion time becomes short or decreases. This may allow the suction opening 334 to move towards the [contact] *first reference* point (*P1*).

If the suction completion time becomes short or decreases, a compression starting time becomes early, resulting in increasing a compression period. If the compression period is increased, a motor efficiency may be enhanced, and thus, a compression efficiency of the compressor may be enhanced. Further, as a linear velocity in the first quadrant (Q1) and the second quadrant (Q2) is reduced, a frictional loss on the inner circumferential surface 332 of the cylinder 330 corresponding to the first ellipse *segment pair* 332a may be reduced.

Like the first ellipse *segment pair* 332a, the second ellipse *segment pair* 332b [may be] *is* formed as two [ellipses] *ellipse segements* (or partial ellipses) 332b', 332b" [having a same sum of distances to two focal points for every point thereon]. [Center points of the] *The* two [ellipses] *ellipse segements* 332b', 332b" [are overlapped with each other to form] *have* the same center point [(O')] (*O"*). The ellipse *segment 332b" is* positioned at a relatively short distance from the first [contact] *reference* point (P1) [than] *compared to* the ellipse *segment 332b'* positioned at a relatively long distance from the first [contact] *reference* point (P1), *The ellipse segment 332b"*may be formed such that a distance between [two] *its* focal points [thereon] is relatively large *in comparison to a distance between focal points of the ellipse segment 332b'*. That is, the second ellipse *segment pair* 332b may be formed in an asymmetrical shape, [on the basis of] *with respect to* a center line passing through the second center point (O") and perpendicular to the first center line (L1) (hereinafter, referred to as a "fourth center line L4")[, even if the sum of distances to two focal points for every point thereon is the same].

In this case, it is assumed that a section from the first center line (L1) to an intersection point between the two [ellipses] *ellipse segments* 332b',332b", that is, the fourth center line (L4), in the rotational direction of the roller 340 is defined as a third quadrant (Q3), and a section from the fourth center line (L4) to the first [contact] *reference* point (P1) in the rotational direction of the roller 340 is defined as a fourth quadrant (Q4). The ellipse *segment* 332b' in the third quadrant (Q3) and the ellipse *segment* 332b" in the fourth quadrant (Q4) have a same length of a long axis, but have different lengths of short axes. That is, as the ellipse *segment* 332b" in the fourth quadrant (Q4) has a smaller short axis than the ellipse *segment* 332b' in the third second quadrant (Q3), an eccentricity of the ellipse *segment* 332b' in the third quadrant (Q3) is smaller than that of the ellipse *segment* 332b" in the fourth quadrant (Q4).

Accordingly, as a compression gradient in the third quadrant (Q3) and the fourth quadrant (Q4) becomes gradual, an over-compression amount may be reduced. This may enhance a compression efficiency. Further, as a linear velocity in the third quadrant (Q3) and the fourth quadrant (Q4) is reduced, a frictional loss on the inner circumferential surface 332 of the cylinder 330 corresponding to the second ellipse *segment pair* 332b may be reduced.

FIG. 7 shows graphs comparing suction completion times with each other according to a *hybrid elliptical* shape [of an ellipse] which forms the inner circumferential surface of the cylinder. An ellipse *segment* with respect to each quadrant may be defined as follows. Referring to FIG. 6, on the first ellipse *segment* 332a' in the first quadrant (Q1) and the [first] *second* ellipse *segment* 332a" in the second quadrant (Q2), it may be assumed that a long-axis [radius] *dimension* of the first ellipse *segment pair* 332a [corresponding to] *positioned along* the third center line (L3) is A, a short-axis [radius] *dimension* of the first ellipse *segment* 332a' in the first quadrant (Q1) is B1, and a short-axis [radius] *dimension* of the [first] *second* ellipse *segment* 332a" in the second quadrant (Q2) is B2. In this case, the short-axis [radius] *dimension* of the first ellipse [332a] *segment 332a'*in the first quadrant (Q1) with respect to the long-axis [radius] *dimen-*

*sion* of the first ellipse *segment pair* 332a may satisfy a formula, 0.5≤B1/A≤0.7. And the short-axis [radius] *dimension* of the [ first] *second* ellipse *segment* 332a" in the second quadrant (Q2) with respect to the long-axis [radius] *dimension* of the first ellipse *segment pair* 332a may satisfy a formula, 0.7≤B2/A≤0.9.

On the [second] *third* ellipse *segment* 332b' in the third quadrant (Q3) and the [second] *fourth* ellipse *segment* 332b" in the fourth quadrant (Q4), it may be assumed that a short-axis [radius] *dimension* of the [second] *third* ellipse *segment* 332b' in the third quadrant (Q3) is B3, a short-axis [radius] *dimension* of the [second] *fourth* ellipse *segment* 332b" in the fourth quadrant (Q4) is B4, and a [radius] *dimension* of the cylinder 330 [at] *along* the fourth center line (L4) is C. In this case, the short-axis [radius] *dimension* (B3) of the [second] *third* ellipse *segment* 332b' in the third quadrant (Q3), with respect to the [radius] *dimension C* of the cylinder 330 may satisfy a formula, 1.0≤B3/C≤1.2. Further, the short-axis [radius] *dimension* (B4) of the [second] *fourth* ellipse *segment* 332b" in the fourth quadrant (Q4), with respect to the [radius] *dimension C* of the cylinder 330 may satisfy a formula, 0.8≤B4/C≤1.0.

Figure 7A:
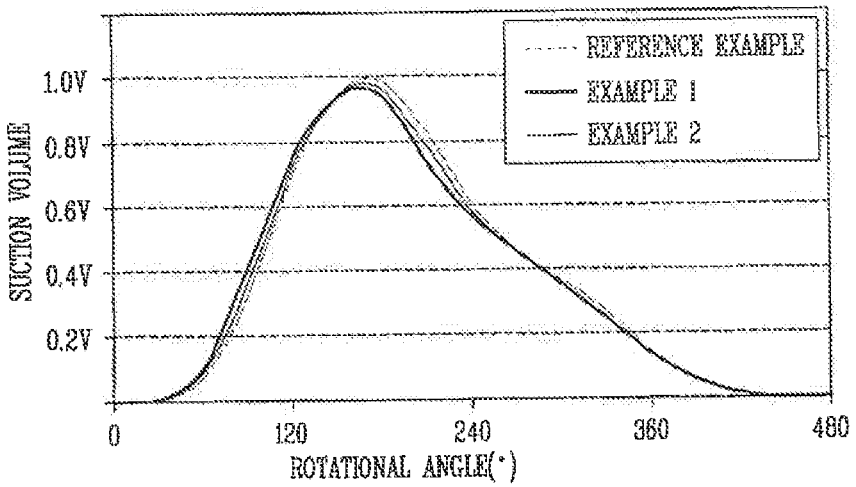
FIGS. 7A-7C [shows] *show* graphs comparing suction completion times with each other according to a shape of an ellipse which forms an inner circumferential surface of a cylinder.
Figure 7B:
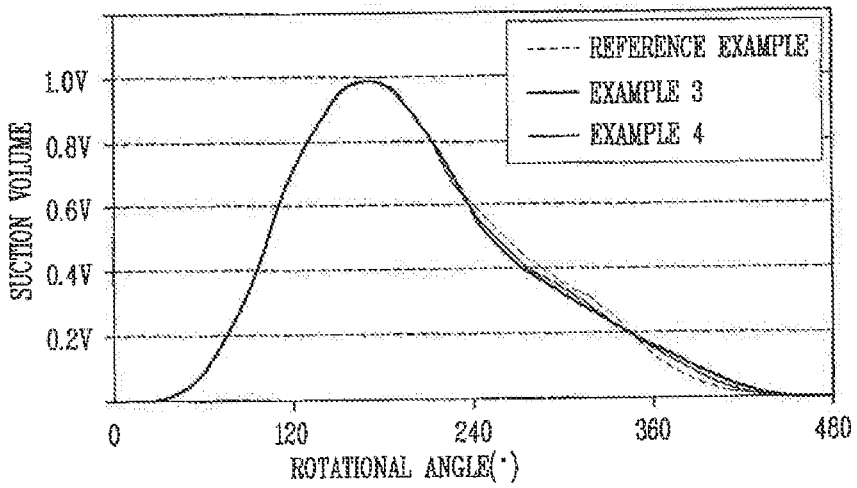
Figure 7C:
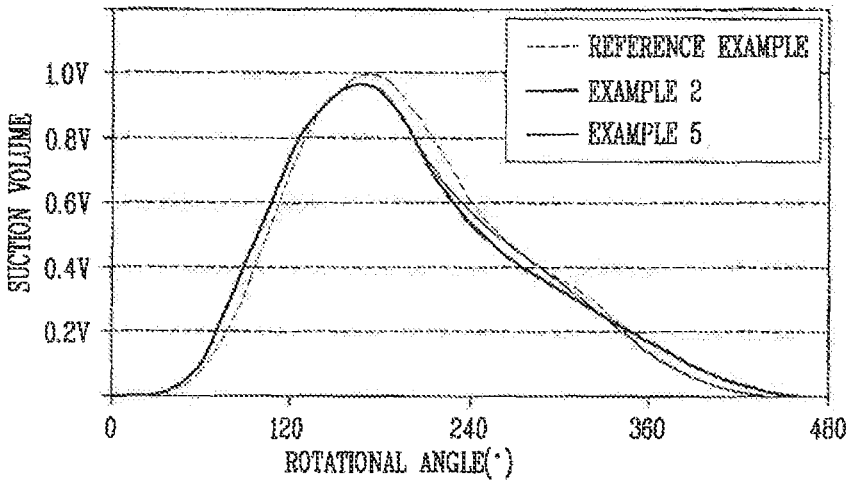

Referring to [FIG. 7] *FIGS. 7A-7C* under such conditions, when the [radiuses] *dimensions* in the respective quadrants are defined as the following examples, results are obtained as shown in the following table.

TABLE 1

| Items | | Reference Example | Example ① | Example ② | Example ③ | Example ④ | Example ⑤ |
|---|---|---|---|---|---|---|---|
| Quadrant 1 | B1/A | 0.7 | 0.6 | 0.5 | 0.7 | 0.7 | 0.5 |
| Quadrant 2 | B2/A | 0.7 | 0.8 | 0.9 | 0.7 | 0.7 | 0.9 |
| Quadrant 3 | B3/C | 1 | 1 | 1 | 1.1 | 1.2 | 1.2 |
| Quadrant 4 | B4/C | 1 | 1 | 1 | 0.9 | 0.9 | 0.8 |

That is, it was shown that suction completion times of [ellipses] *hybrid elliptical shapes* corresponding to examples $\hat{1}$, $\hat{2}$ and $\hat{5}$ are earlier than that of an [ellipse] *elliptical shape* corresponding to the reference example. Suction completion times of [ellipses] *hybrid elliptical shapes* corresponding to examples $\hat{3}$ and $\hat{4}$ are equal to that of the [ellipse] *elliptical shape* corresponding to the reference example.

Further, it was shown that compression starting times of the [ellipses] *hybrid elliptical shapes* corresponding to the examples $\hat{1}$, $\hat{2}$ and $\hat{5}$ are earlier than that of an [ellipse ] *elliptical shape* corresponding to the reference example, as the suction completion times thereof become early. Compression starting times of the [ellipses] *hybrid elliptical shapes* corresponding to the examples $\hat{3}$ and $\hat{4}$ are slightly earlier than that of the [ellipse] *elliptical shape* corresponding to the reference example.

When the [ellipses] *ellipse segments* in the respective quadrants (Q1,Q2,Q3,Q4) which form the inner circumferential surface 332 of the cylinder 330 are defined, it may be seen that the suction starting time becomes early and thus a compression is performed early.

In the aforementioned embodiments, the first center point (O') is formed to be farther from the *lateral* center (Oc) of *the inner space of* the cylinder 330, than the second center point (O"). However, the second center point (O") may be formed to be farther from the *lateral* center (Oc) of *the inner space of* the cylinder 330, than the first center point (O'). This may be selectively applied according to whether the compressor is in a cooling mode or a heating mode.

As the inner circumferential surface of the cylinder is formed in an asymmetrical shape having four [ellipses] *ellipse segments*, a volume diagram may be variously controlled. As a result, a suction period and a compression period may be properly controlled to enhance a compression efficiency. Accordingly, the inner circumferential surface of the cylinder may be formed to have a larger number of [ellipses] *ellipse segments* than the aforementioned [ellipses] *elliptical shapes* .

A sealing section 338 having a same curvature radius [(Rc)] as a curvature radius (Rr) of the roller 340 may be further formed on the inner circumferential surface 332 of the cylinder 330 including the first [contact] *reference* point (P1). FIG. 8 is an enlarged sectional view of the cylinder shown in FIG. 4 according to another embodiment.

[That is] *In the embodiment of FIG. 4*, the ellipse *segment* 332a' corresponding to the first quadrant (Q1) and the ellipse *segment* 332b" corresponding to the fourth quadrant (Q4) are connected to each other at a region corresponding to the first [contact] *reference* point (P1) [among] *of* the inner circumferential surface 332 of the cylinder 330. However, a curvature radius [(Rc)] at this region is larger than a curvature radius (Rr) of the roller 340 formed by the outer circumferential surface 341 of the roller 340, similar to the curvature radius [(Rc)] at other regions. Accordingly, the outer circumferential surface 341 of the roller 340, and the inner circumferential surface 332 of the cylinder 330 [linearly] *are almost in linear* contact *with* each other [even] at the first [contact] *reference* point (P1).

The first compression chamber 333a which forms a suction pressure and the [third] *second* compression chamber [333c] *333b* which forms a discharge pressure are formed at both sides of the first [contact] *reference* point (P1). Accordingly, a sealing force of the first [contact] *reference* point (P1) should be higher than that of another region. For this, an oil film on the first [contact] *reference* point (P1) should be widely formed and should be maintained stably. However, if the outer circumferential surface 341 of the roller 340 and the inner circumferential surface 332 of the cylinder 330 [linearly] *are almost in linear* contact *with* each other [even] at the first [contact] *reference* point (P1), oil is not kept at the first [contact] *reference* point (P1). This may cause an oil film not to be formed, thereby not sealing a space between the two compression chambers.

However, as shown in FIG. 8, if a curvature radius (Rc1) of the inner circumferential surface 332 of the cylinder 330 at a sealing section 338 of the first [contact] *reference* point (P1) is smaller than a curvature radius (Rc2) of the inner circumferential surface 332 of the cylinder 330 at another region, and is the same as the curvature radius (Rr) of the roller 340 formed by the outer circumferential surface 341 of the roller 340, the roller 340 and the cylinder 330 *almost* come into [planar-contact] *planar contact* with each other at the sealing section 338. Then, the sealing section 338 of the first [contact] *reference* point (P) serves as a sealing section to keep a predetermined amount of oil therein. As a result, an oil film 338a may be formed at the sealing section 338, thereby enhancing a sealing effect between the compression chambers 333a, [333c] *333b*.

Embodiments disclosed herein provide a vane rotary compressor capable of excluding a sub discharge opening except for a main discharge opening, or capable of minimizing the number of sub discharge openings or an inner diameter of the sub discharge opening and effectively reducing over-compression. Further, embodiments disclosed herein provide a vane rotary compressor capable of variously controlling a volume diagram by forming an inner circumferential surface of a cylinder in an asymmetric shape, and capable of enhancing a compression efficiency by properly changing a suction period and a compression period. Furthermore, embodiments disclosed herein provide a vane rotary compressor capable of preventing refrigerant leakage between compression chambers and capable of reducing a frictional loss between a cylinder and a vane[, by reducing a] . *A* pressure difference between the compression chambers *is reduced* by reducing a suction period and increasing a compression period. *This is accomplished* by changing a shape of an inner circumferential surface of the cylinder.

Embodiments disclosed herein also provide a vane rotary compressor capable of enhancing a compression efficiency by reducing an over-compression amount by making a gradient of a compression period gradual. Embodiments disclosed herein provide a vane rotary compressor capable of preventing refrigerant leakage between a suction chamber and a discharge chamber by obtaining a wide sealing area at a region near a cylinder and a roller. Embodiments disclosed herein further provide a vane rotary compressor having a structure that an inner circumferential surface of a cylinder is formed in an elliptical shape[, and a] . *A* long axis of the cylinder is eccentrically spaced apart from a center of the cylinder by a predetermined distance. [A center line in a direction of the long axis of the cylinder, perpendicular to a center line in a direction of a short axis of the cylinder may be formed in plurality in number.]

Embodiments disclosed herein provide a hermetic compressor that may include a cylinder having an inner circumferential surface which forms a compression chamber formed in [an] *a hybrid* elliptical shape; a roller provided to be eccentric from the inner circumferential surface of the cylinder, and configured to change a volume of the compression chamber by being rotated; and a vane formed to be withdrawn towards the inner circumferential surface of the cylinder when the roller is rotated, and configured to divide the compression chamber into a plurality of spaces. [On the basis of] *A first center line passes through* a [contact] *first reference* point where the inner circumferential surface of the cylinder and an outer circumferential surface of the roller are closest [to each other, and a first center line passing] *and* through a *lateral* center of *an inner space of* the cylinder[, an] . *A first pair of* ellipse *segments are* positioned at [one] *a first* side of the first center line and [forming] *form portions of* the inner circumferential surface of the cylinder [may be defined as a first ellipse, a] . *A* center point of the first *pair of* ellipse [may be defined as] *segments is* a first center point[, an] . *A second pair of* ellipse *segments are* positioned at [another] *a second* side of the first center line and [forming] *form portions of* the inner circumferential surface of the cylinder [may be defined as a second ellipse, a] . *A* center point of the second *pair of* ellipse [may be defined as] *segments is* a second center point[. Under these assumptions], *and* the first center point and the second center point [may be] *are* spaced apart from the *lateral* center *of the inner space* of the cylinder.

The first center point and the second center point may be positioned on the first center line. The first center point and the second center point may be positioned on the first center line, at different separation distances from the *lateral* center *of the inner space* of the cylinder.

The first center point and the second center point may be positioned on a same side, [on the basis of] *with respect to* a second center line passing through the *lateral* center of *the inner space of* the cylinder and perpendicular to the first center line. The first center point may be farther from the *lateral* center of the cylinder than the second center point.

The first ellipse [may be] *segment pair is* formed as two [ellipses having a same sum of distances to two focal points for every point thereon] *ellipse segments*. The ellipse *segment* positioned at a relatively short distance from the [contact] *first reference* point [than] *compared to* the ellipse *segment* positioned at a relatively long distance from the [contact] *first reference* point may be formed such that a distance between [two] *its* focal points thereon is relatively large.

The second ellipse [may be] *segment pair is* formed as two [ellipses having a same sum of distances to two focal points for every point thereon] *ellipse segments*. The ellipse *segment* positioned at a relatively short distance from the [contact] *first reference* point [than] *compared to* the ellipse *segment* positioned at a relatively long distance from the [contact] *first reference* point is formed such that a distance between [two] *its* focal points [thereon] is relatively large.

Each of the first ellipse *segment pair* and the second ellipse [may be] *segment pair is* formed as two [ellipses having a same sum of distances to two focal points for every point thereon] *ellipse segments*. [The] *In the first ellipse segment pair, the* first ellipse *segment* positioned at a relatively short distance from the [contact] *first reference* point [than] *compared to* the [first] *second* ellipse *segment* positioned at a relatively long distance from the [contact] *first reference* point may be formed such that a distance between [two] *its* focal points [thereon] is relatively large. [The second] *In the second ellipse segment pair, the fourth* ellipse *segment* positioned at a relatively short distance from the [contact] *first reference* point [than] *compared to* the [second] *third* ellipse *segment* positioned at a relatively long distance from the [contact] *first reference* point may be formed such that a distance between [two] *its* focal points [thereon] is relatively large.

A line passing through the first center point in a direction perpendicular to the first center line may be defined as a third center line, and a line passing through the second center point in a direction perpendicular to the first center line may be defined as a fourth center line. A region of the first ellipse *segment pair* may be divided into first and second quadrants in a rotational direction of the roller by the first and third center lines, and a region of the second ellipse *segment pair* may be divided into third and fourth quadrants by the first and fourth center lines. The [ellipses] *ellipse segments* in the four quadrants may be formed to have different distances between [two] focal points [thereof].

The [contact] *first reference* point may be included in the first quadrant [on the basis of the third center line], and a distance between [two] focal points of an ellipse *segment* in the first quadrant including the [contact] *first reference* point may be formed to be larger than that of an ellipse *segment* in the second quadrant. The [contact] *first reference* point may be included in the fourth quadrant on the basis of the fourth center line, and a distance between [two] focal points of an ellipse *segment* in the fourth quadrant including the [contact] *first reference* point may be formed to be larger than that of an ellipse *segment* in the third quadrant. A section having a same curvature radius as the roller may be further formed at a peripheral section*of the inner circumferential surface of the cylinder* including the [contact] *first reference* point [among the inner circumferential surface of the cylinder].

Embodiments disclosed herein provided a hermetic compressor that may include a cylinder having an inner circumferential surface which forms a compression chamber formed in [an] *a hybrid* elliptical shape; a roller provided to be eccentric from the inner circumferential surface of the cylinder, and configured to change a volume of the compression chamber by being rotated; and a vane formed to be withdrawn towards the inner circumferential surface of the cylinder when the roller is rotated, and configured to divide the compression chamber into a plurality of spaces. A position where the inner circumferential surface of the cylinder and an outer circumferential surface of the roller are closest to each other may be [a contact] *the first reference* point, a line passing through the [contact] *first reference* point and a *lateral* center of *an inner space of* the cylinder may be a first center line, and a line perpendicular to the first center line and passing through the *lateral* center of *the inner space of* the cylinder may be a second center line. Under the assumptions, the inner circumferential surface of the cylinder may be formed to have an asymmetrical shape [on the basis of] *with respect to* the first and second center lines.

The inner circumferential surface of the cylinder may be divided into four quadrants by the first and second center lines, and the quadrants corresponding to each other among the four quadrants may be formed to be asymmetrical with each other [on the basis of] *with respect to* the second center line.

The vane rotary compressor according to embodiments may have at least the following advantages.

Firstly, as a compression period is formed to be long, a pressure difference between the compression chambers may be lowered, in a state that a sub discharge opening is excluded or the number of sub discharge openings or an inner diameter of the sub discharge opening is minimized. With such a configuration, the number of processes with respect to the sub discharge opening, and the number of valves for opening and closing the sub discharge openings may be reduced, resulting in lowering the fabrication costs.

Further, as the inner circumferential surface of the cylinder is formed in an asymmetrical shape having [three or more ellipses] *four partial ellipse segments*, a volume diagram may be variously controlled. As a result, a suction period and a compression period may be properly controlled to enhance a compression efficiency.

Furthermore, as the inner circumferential surface of the cylinder is formed such that the suction period is short and the compression period is long, over-compression in the compression chambers may be prevented or reduced. This may enhance a compression efficiency.

Also, as the inner circumferential surface of the cylinder is formed such that *a position of* a suction completion time and a compression starting time are towards a suction opening, the compression period becomes long, and thus, a compression difference between the compression chambers is reduced. Besides, as the compression period has a gradual gradient, an over-compression amount may be reduced.

Further, as a wide sealing area is obtained at a region near the cylinder and the roller, refrigerant leakage between a suction chamber and a discharge chamber may be prevented. This may reduce a suction loss or a compression loss.

Further scope of applicability of embodiments will become more apparent from the detailed description given. However, it should be understood that the detailed description and specific examples, while indicating embodiments, are given by way of illustration only, since various changes and modifications within the spirit and scope will become apparent to those skilled in the art from the detailed description.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A hermetic compressor, comprising:

a cylinder having an inner circumferential surface, which [forms] *bounds* a compression [chamber, formed in an elliptical shape] *space within the cylinder*;

a roller provided to be eccentric from the inner circumferential surface of the cylinder, and configured to [change a volume of the compression chamber by being] rotated; and at least one vane formed to be withdrawn towards the inner circumferential surface of the cylinder when the roller is rotated, and configured to divide the compression [chamber] *space* into a plurality of [spaces] *compression chambers, wherein rotation of the roller and the at least one vane causes volumes of the plurality of compression chambers to change,* wherein [on the basis of] *with respect to* a [contact] *reference* point where the inner circumferential surface of the cylinder and an outer circumferential surface of the roller are closest to each other, and a first center line passing through a *lateral* center of *an inner space of* the cylinder *and the reference point*, [an] *a first pair of* ellipse *segments are* positioned at a first side of the first center line and [forming] *form respective portions of* the inner circumferential surface of the cylinder [is defined as a first ellipse], a center point of the first *pair of* ellipse *segments* is defined as a first center point, [an] *a second pair of* ellipse *segments are* positioned at a second side of the first center line and [forming] *form respective portions of* the inner circumferential surface of the cylinder [is defined as a second ellipse], and a center point of the second *pair of* ellipse *segments* is defined as a second center point, the first center point and the second center point are spaced apart from the *lateral* center of *the inner space of* the cylinder, wherein the first center point and the second center point are positioned on the first center line, at different separation distances from the *lateral* center of *the inner space of* the cylinder, and wherein the first center point and the second center point are positioned on a same side[, on the basis] of a second center line passing through the *lateral* center of *the inner space of* the cylinder and perpendicular to the first center line.

2. The hermetic compressor of claim 1, wherein the first center point is farther from the *lateral* center of *the inner space of* the cylinder than the second center point.

3. The hermetic compressor of claim 1, wherein the first *pair of* ellipse *segments* is formed as two [ellipses having a same sum of distances to two focal points for every point thereon] *ellipse segments* , and wherein an ellipse *segment* of the two [ellipses] *ellipse segments* positioned at a relatively short distance from the [contact] *reference* point [than] *compared to* an ellipse *segment* of the two [ellipses] *ellipse segments* positioned at a relatively long distance from the [contact] *reference* point [is formed such that a distance between two focal points thereon is] *has a* relatively [large] *larger eccentricity*.

4. The hermetic compressor of claim 1, wherein the second *pair of* ellipse *segments* is formed as two [ellipses having a same sum of distances to two focal points for every point thereon] *ellipse segments*, and wherein an ellipse *segment* of the two [ellipses] *ellipse segments* positioned at a relatively short distance from the [contact] *reference* point [than] *compared to* an ellipse *segment* of the two [ellipses] *ellipse segments* positioned at a relatively long distance from the [contact] *reference* point [is formed such that a distance between two focal points thereon is] *has a* relatively [large] *larger eccentricity*.

5. The hermetic compressor of claim 1, wherein each of the first *pair of* ellipse *segments* and the second *pair of* ellipse *segments* is formed as two [ellipses having a same sum of distances to two focal points for every point thereon] *ellipse segments*, wherein *one of the ellipse segments of* the first *pair of* ellipse *segments* positioned at a relatively short distance from the [contact] *reference* point [than] *compared to another of the ellipse segments of* the first *pair of* ellipse *segments* positioned at a relatively long distance from the [contact] *reference* point [is formed such that a distance between two focal points thereon is] *has a* relatively [large] *larger eccentricity*, and wherein *one of the ellipse segments of* the second *pair of* ellipse *segments* positioned at a relatively short distance from the [contact] *reference* point [than] *compared to another of the ellipse segments of* the second *pair of* ellipse *segments* positioned at a relatively long distance from the [contact] *reference* point [is formed such that a distance between two focal points thereon is] *has a* relatively [large] *larger eccentricity*.

6. The hermetic compressor of claim 1, wherein a line passing through the first center point in a direction perpendicular to the first center line is defined as a third center line, and a line passing through the second center point in a direction perpendicular to the first center line is defined as a fourth center line, a region of the first *pair of* ellipse *segments* is divided into first and second quadrants in a rotational direction of the roller by the first and third center lines *such that the first pair of ellipse segments includes a first ellipse segment in the first quadrant and a second ellipse segment in the second quadrant*, and a region of the second *pair* ellipse *segments* is divided into third and fourth quadrants by the first and fourth center lines *such that the first pair of ellipse segments includes a first ellipse segment in the first quadrant and a second ellipse segment in the second quadrant*, and wherein *each ellipse segment of* the

[ellipses] *ellipse segments* in the four quadrants [are formed to have] *has a* [different distances between two focal points thereof] *eccentricity*.

7. The hermetic compressor of claim 6, wherein the [contact] *reference* point is included in the first quadrant [on the basis of the third center line], and wherein [a distance between two focal points] *an eccentricity* of [an] *the first* ellipse *segment* in the first quadrant [including the contact point] is [formed to be] larger than [a distance between two focal points] *an eccentricity* of [an] *the third* ellipse *segment* in the second quadrant.

8. The hermetic compressor of claim 6, wherein the [contact] *reference* point is included in the fourth quadrant [on the basis of the fourth center line], and wherein [a distance between two focal points] *an eccentricity* of [an] *the fourth* ellipse *segment* in the fourth quadrant including the contact point is formed to be larger than a distance between two focal points of an ellipse in the third quadrant.

9. The hermetic compressor of claim 1, wherein a section having a same curvature radius as the roller is formed at a sealing section including the [contact] *reference* point along the inner circumferential surface of the cylinder.

10. A hermetic compressor, comprising:

a cylinder having an inner circumferential surface, which [forms] *bounds* a compression [chamber formed in an elliptical shape] *space within the cylinder*;

a roller provided to be eccentric from the inner circumferential surface of the cylinder, and configured to [change a volume of the compression chamber by being] *be* rotated; and at least one vane formed to be withdrawn towards the inner circumferential surface of the cylinder when the roller is rotated, and configured to divide the compression [chamber] *space* into a plurality of [spaces] *compression chambers, wherein rotation of the roller and the at least one vane causes volumes of the plurality of compression chambers to changes*wherein [a position where] the inner circumferential surface of the cylinder and an outer circumferential surface of the roller are closest to each other [is] *at* a [contact] *reference* point, a line passing through the [contact] *reference* point and a *lateral* center of *an inner space of* the cylinder is a first center line, *a line perpendicular to the first center and passing through the lateral center of the inner space of the cylinder is a second center line*, and lines perpendicular to the first center line and passing through a first center [pint] *point* and a second center point are third and fourth center lines, the inner circumferential surface of the cylinder is divided into four quadrants and in each of the four quadrants the inner circumferential surface of the cylinder is in the shape of a different partial ellipse, wherein [each of] *a* first [and second] *pair of* partial ellipses formed above [and below] the first center line [ include two] *includes first and second* partial ellipses having [a same sum of distances to two focal points for every point thereon] *the first center point, wherein a second pair of partial ellipses formed below the first center line includes third and fourth partial ellipses having the second center point,* wherein the first partial ellipse *is* positioned at a relatively short distance from the [contact] *reference* point [than] *compared to* the [first] *second* partial ellipse *which is* positioned at a relatively long distance from the [contact] *reference* point [is formed such that a distance between two focal points thereon] , *wherein an eccentricity of the first partial ellipse* is relatively large, [and] wherein the [second] *fourth* partial ellipse *is* positioned at a relatively short distance from the [contact] *reference* point [than] *compared to* the [second] *third* partial ellipse *which is* positioned at a relatively long distance from the [contact] *reference* point [is formed such that a distance between two focal points thereon] , *and wherein an eccentricity of the fourth partial ellipse* is relatively large.

11. The hemetic compressor of claim 10, where a region of the first *pair of* partial [ellipse] *ellipses* is divided into first and second quadrants in a rotational direction of the roller by the first and [second] *third* center lines, and a region of the second [ellipse] *pair of partial ellipses* is divided into third and fourth quadrants by the first and [third] *fourth* center lines, and wherein [the] *each* partial [ellipses] *ellipse* in the four quadrants [are formed to have] *has a* different [distances between two focal points thereon] *eccentricity*.

12. The hermetic compressor of claim 10, wherein a section having a same curvature radius as the roller is formed at a sealing section including the [contact] *reference* point along the inner circumferential surface of the cylinder.

*13. A hermetic compressor, comprising:*

*a cylinder having an inner circumferential surface, which bounds a compression space within the cylinder;*

*a roller provided to be eccentric from the inner circumferential surface of the cylinder; and configured to be rotated; and*

*at least one vane formed to be withdrawn towards the inner circumferential surface of the cylinder when the roller is rotated, and configured to divide the compression space into a plurality of compression chambers, wherein rotation of the roller and the at least one vane causes volumes of the pluraligz of compression chambers to change, wherein the inner circumferential surface of the cylinder and an outer circumferential surface of the roller are closest to each other at a reference point, a line passing through the reference point and a lateral center of an inner space of the cylinder is a first center line, and a line perpendicular to the first center line and passing through the lateral center of the inner space of the cylinder is a second center line, the inner circumferential surface of the cylinder is divided into four quadrants and in each of the four quadrants the inner circumferential surface of the cylinder is in the shape of a different partial ellipse, wherein a first partial ellipse and a second partial ellipse are formed at a first side with respect to the first center line and a third partial ellipse and a fourth partial ellipse are formed at a second side with respect to the first center line, wherein the first partial ellipse is positioned at a relatively short distance from the reference point compared to the second partial ellipse which is positioned at a relatively long distance from the reference point. wherein an eccentricity of the first partial ellipse is relatively large, wherein the fourth partial ellipse is positioned at a relatively short distance from the reference point compared to the third partial ellipse which is positioned at a relatively long distance from the reference point, and wherein an eccentricigz of the fourth partial ellipse is relatively large.*

*14. The hermetic compressor of claim 13, wherein an eccentricity of each of the first to fourth partial ellipses is different than an eccentricity of the other partial ellipses.*

*15. The hermetic compressor of claim 13, wherein a section having a same curvature radius as the roller is*

*formed at a sealing section including the reference point along the inner circumferential surface of the cylinder.*

* * * * *